United States Patent
Bowers et al.

(10) Patent No.: US 11,496,370 B1
(45) Date of Patent: *Nov. 8, 2022

(54) SYSTEM AND METHODS FOR MULTIPATH DATA COMMUNICATIONS

(71) Applicant: Jump Algorithms, LLC, Chicago, IL (US)

(72) Inventors: Kevin J. Bowers, Chicago, IL (US); Nicholas E. Bridge, Lisle, IL (US)

(73) Assignee: Jump Algorithms, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/165,345

(22) Filed: Feb. 2, 2021

Related U.S. Application Data

(63) Continuation of application No. 16/555,396, filed on Aug. 29, 2019, now Pat. No. 10,958,530.

(51) Int. Cl.
*H04L 41/14* (2022.01)
*G06F 7/72* (2006.01)
(Continued)

(52) U.S. Cl.
CPC .............. *H04L 41/145* (2013.01); *G06F 7/72* (2013.01); *G06F 7/723* (2013.01); *G06F 7/727* (2013.01);
(Continued)

(58) Field of Classification Search
CPC ... H04L 41/145; H04L 9/0637; H04L 41/142; H04L 43/0876; G06F 7/72; G06F 7/723;
(Continued)

(56) References Cited

U.S. PATENT DOCUMENTS

| 4,555,784 A | 11/1985 | Wood |
| 10,129,159 B2 | 11/2018 | Blumenthal et al. |

(Continued)

FOREIGN PATENT DOCUMENTS

| CN | 108736917 A | 5/2018 |
| WO | 2018104929 A1 | 6/2018 |
| WO | 2019007485 A1 | 1/2019 |

OTHER PUBLICATIONS

Celebiler, M. & G. Stette, "On Increasing the DownLink Capacity of a Regenerative Satellite Repeater in Point-to-Point Communications," Proceedings of the IEEE, 1978, vol. 66, pp. 98-100.
(Continued)

*Primary Examiner* — Michael A Keller
(74) *Attorney, Agent, or Firm* — Beem Patent Law Firm

(57) ABSTRACT

A system for transmitting information may include a server that generates pseudo-random superpositions, each superposition including multiple packet fragments encoded using a Galois field. The system may transmit the superpositions across a plurality of communication links, which form a single logical path, to a client device. Communication links may include a combination of diverse communication channels, and more preferably one or more low latency (but low bandwidth) communication links and one or more high bandwidth (but high latency) communication links. Advantageously, the use of a plurality of communication links may facilitate transmitting information quickly and reliably.

20 Claims, 7 Drawing Sheets

(51) Int. Cl.
  *H03M 13/00* (2006.01)
  *G06N 5/00* (2006.01)
  *H04L 9/06* (2006.01)
  *H04L 43/0876* (2022.01)
  *H04L 41/142* (2022.01)

(52) U.S. Cl.
  CPC .............. *G06F 7/728* (2013.01); *G06N 5/003* (2013.01); *H03M 13/6575* (2013.01); *H04L 9/0637* (2013.01); *H04L 41/142* (2013.01); *H04L 43/0876* (2013.01)

(58) Field of Classification Search
  CPC .......... G06F 7/727; G06F 7/728; G06N 5/003; H03M 13/6575
  See application file for complete search history.

(56) References Cited

U.S. PATENT DOCUMENTS

| | | | |
|---|---|---|---|
| 2008/0065959 | A1 | 3/2008 | Pisek et al. |
| 2008/0123618 | A1 | 5/2008 | Papadopoulos |
| 2013/0106627 | A1* | 5/2013 | Cideciyan ............ H03M 7/4043 341/87 |
| 2014/0281837 | A1 | 9/2014 | Frigo et al. |
| 2017/0118673 | A1* | 4/2017 | Narasimha .......... H03M 13/373 |
| 2017/0142238 | A1 | 5/2017 | Gligoroski et al. |
| 2017/0195208 | A1 | 7/2017 | Kissel |
| 2020/0305842 | A1 | 10/2020 | Rosenzweig et al. |

OTHER PUBLICATIONS

Ahlswede et al., "Network information flow theory," Proceedings of the IEEE, 1998.
Li et al., "Linear codes for network information flow," Proceedings of the IEEE, 1999.
Ahlswede et al., "Network Information Flow," IEEE Transactions on Information Theory, 2000, vol. 46, pp. 1204-1216.
Li et al., "Linear Network Coding," IEEE Transactions on Information Theory, 2003, vol. 49, pp. 371-381.
Ho et al., "The Benefits of Coding over Routing in a Randomized Setting," 2003, pp. 1-6.
Ho et al., "On Randomized Network Coding," 2003, 10 pgs.
Dougherty et al., "Insufficiency of Linear Coding in Network Information Flow," IEEE Transactions on Information Theory, 2005, vol. 51, pp. 2745-2759.
Bhadra et al. "Looking at Large Networks: Coding vs. Queueing," 2006, pp. 1-13.
Wang et al. "How Practical is Network Coding?" 2006, 5 pgs.
Ho, Tracey, "A network coding tutorial," Center for Mathematics of Information, California Institute of Technology, 65 pgs.
Ho et al., "A Random Linear Network Coding Approach to Multicast," IEEE Transactions on Information Theory, 2006, vol. 52, pp. 4413-4430.
Sengupta et al., "An Analysis of Wireless Network Coding for Unicast Sessions: The Case for Coding-Aware Routing," 2007, 9 pgs.
Larsson et al. "Multi-User ARQ," 2007, 6 pgs.
Silva et al., "A Rank-Metric Approach to Error Control in Random Network Coding," IEEE International Symposium on Information Theory, 2007, pp. 1-42.
Nguyen et al., "Wireless Broadcast Using Network Coding," 2008, pp. 1-25.
Katti et al., "XORs in The Air: Practical Wireless Network Coding," SIGCOMM'06, 2006, 12 pgs.
Kotter et al., "Coding for Errors and Erasures in Random Network Coding," IEEE Transactions on Information Theory, 2007, pp. 1-30.
Dimakis et al., "Network Coding for Distributed Storage Systems," Department of Electrical Engineering and Computer Science, University of California at Berkeley, 2008, 12 pgs.
Trautmann, Anna-Lena, "Finite Spreads in Random Network Coding," Colloquium on Galois Geometry, 2012, 68 pgs.
Li, Yuan, "The Limitation of Random Network Coding," 2018, 6 pgs.
Firooz et al., "Wireless Network Coding via Modified 802.11 MAC/PHY: Design and Implementation on SDR," 2012, 10 pgs.
Firooz et al., "Data Dissemination in Wireless Networks with Network Coding," 2013, 4 pgs.
Kim et al., "Network Coded TCP (CTCP)," 2013, 12 pgs.
Krigslund et al., "CORE: COPE with MORE in Wireless Meshed Networks," IEEE Conference Publication, 2013, 3 pgs.
Barekatain et al., "MATIN: A Random Network Coding Based Framework for High Quality Peer-to-Peer Live Video Streaming," PLOS One, 2013, vol. 8, pp. 1-17.
Fiandrotti et al., "Band Codes for Energy-Efficient Network Coding with Application to P2P Mobile Streaming," IEEE, 2013, 12 pgs.
Heide et al., "Random Linear Network Coding (RLNC)-Based Symbol Representation," Internet-Draft of Internet Engineering Task Force (IETF) Trust, 2018, 13 pgs.
Bilal et al., "Network-Coding Approach for Information-Centric Networking," IEEE Systems Journal, 2018, 10 pgs.
International Search Report dated Nov. 3, 2020, issued in International Application No. PCT/US2020/045108 (5 pages).
Gabriel et al. Multipath Communication with Finite Sliding Window Network Coding for Ultra-Reliability and Low Latency. IEEE 2018.
Magli et al. Network Coding Meets Multimedia: A Review. IEEE Transactions on Multimedia. Vol. 15, No. 5. Aug. 2013.

\* cited by examiner

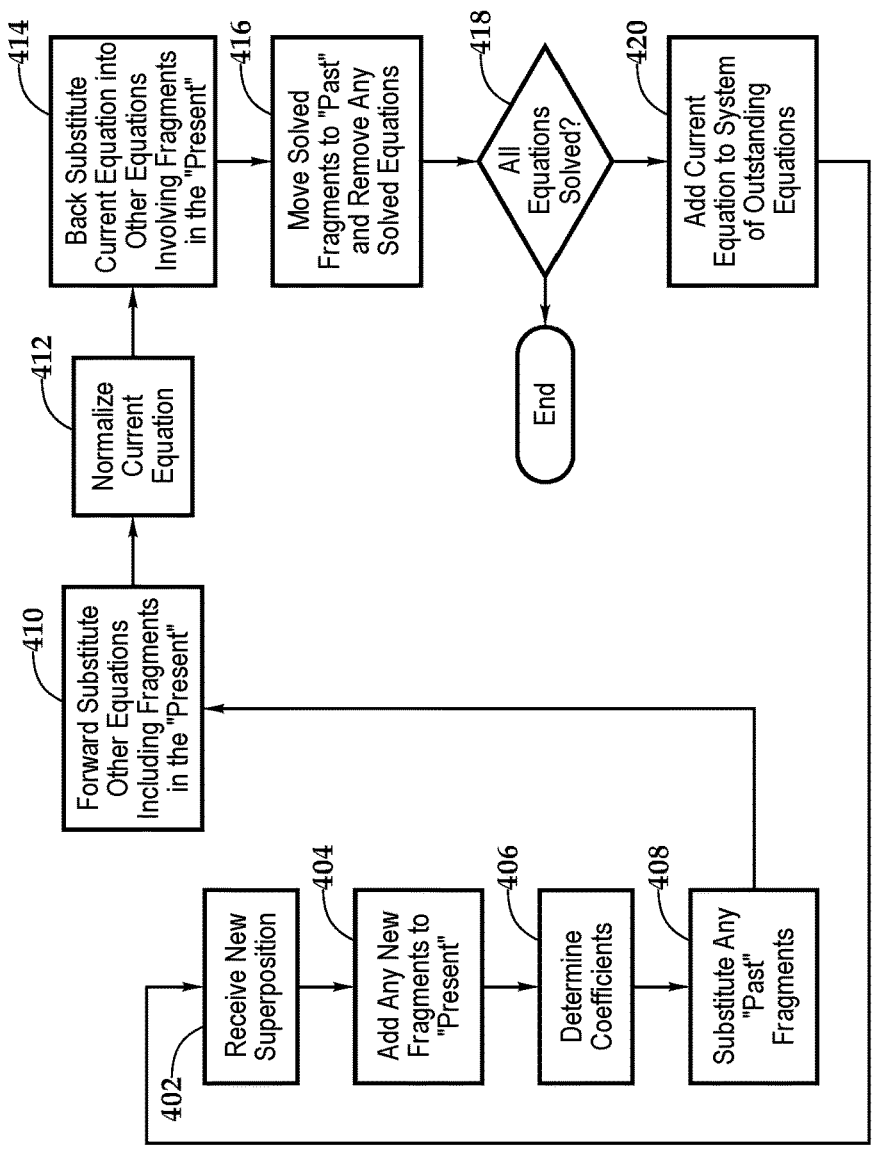
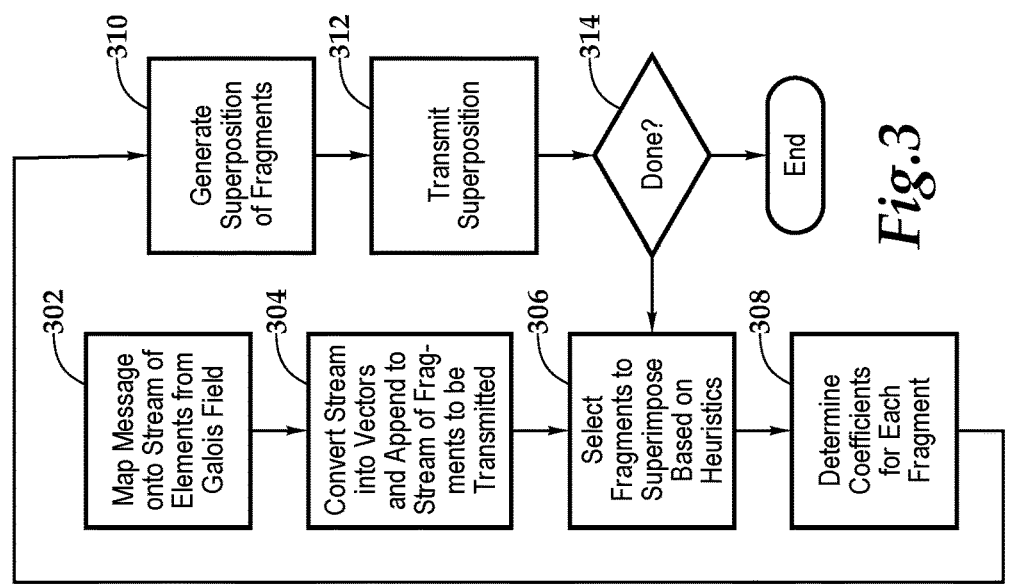
Fig.4
Fig.3

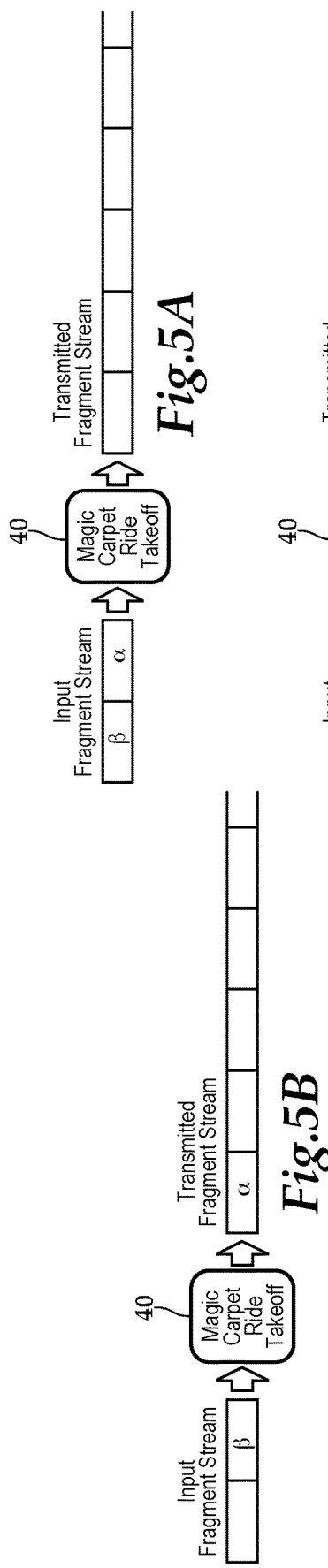
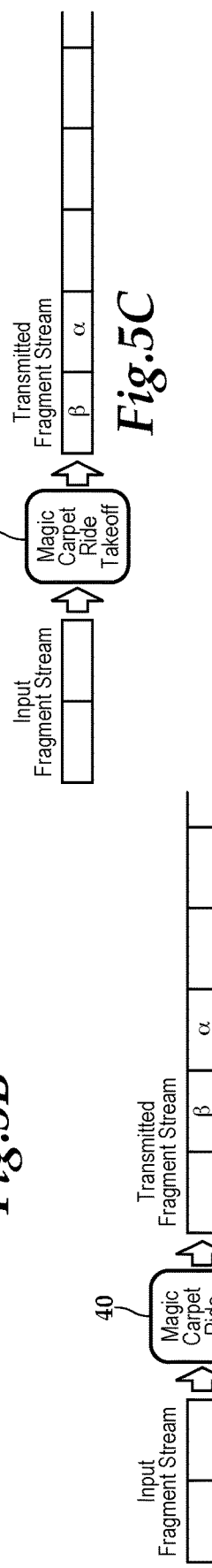
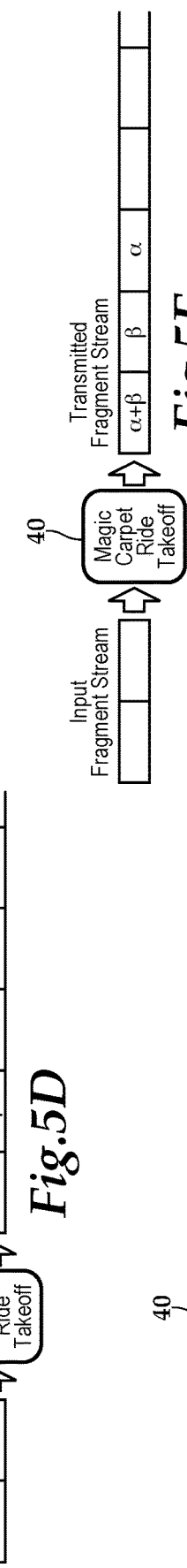
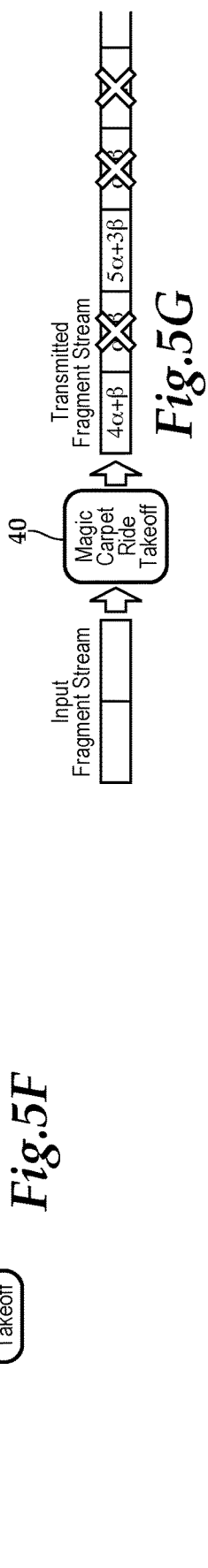

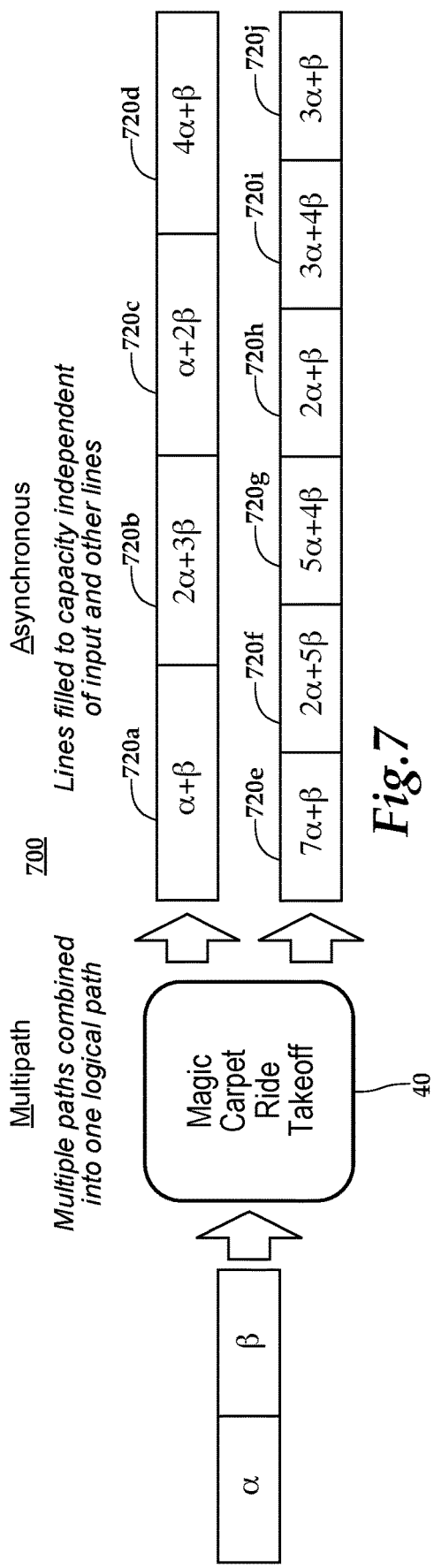

SYSTEM AND METHODS FOR MULTIPATH DATA COMMUNICATIONS

RELATED APPLICATIONS

This application is a continuation of U.S. application Ser. No. 16/555,396 filed Aug. 29, 2019, which is incorporated by reference herein in its entirety.

BACKGROUND OF THE INVENTION

1. Technical Field

The present invention relates generally to data communications, and more specifically, to systems and methods for increasing the speed and reliability of communications between computer systems.

2. Related Art

Computer networking provides a mechanism to interconnect multiple devices (also called nodes) for the purpose of sending and/or receiving data among the interconnected devices. A variety of technologies have been used to transmit information among the interconnected device of a computer network, such as wired communication links and wireless communication links. The technologies all have varying performance characteristics, such as bandwidth, latency and reliability, and traditional approaches to computer networking have required a network designer to prioritize one performance metric at the cost of another.

For example, wireless communication links such as microwave and millimeter wave transmitters generally provide exceptional latency, transferring data at or near the speed of light. However, wireless communication links can be unreliable. One primary reason for the unreliability of wireless data transfer is the inability of a wireless server to quickly determine and remedy drops which can occur from a variety of sources, such as hardware failure, storms, wind gusts, tower vibrations, network congestion and the like. For example, packet loss rates for wireless communications may be about 0.1% to about 2% depending on packet size. In addition, wireless communication may provide less bandwidth than a wired link such as a fiber optical link.

As compared to wireless communication links, wired communication links generally provide exceptional reliability (nearly zero packet loss) and bandwidth. However, the latency of a wired link is often much higher than their wireless counterparts. For example, the speed of light is about 1.5 times slower in conventional solid core single-mode fiber than in air (although certain fiber optic cables, such as photonic bandgap or hollow-core fiber optic cables, may exhibit a lower latency than solid core fiber optic cables). As another factor, wired links typically travel a much further distance than a direct wireless path because physical obstructions usually mandate that suboptimal paths be used to connect the nodes. These problems are exacerbated when the distance between the nodes are large, such as several hundred or even thousands of miles.

Random linear network coding, in which encoded packets consisting of linear combinations of other packets multiplied by random coefficients are transmitted by the system, has been used to attempt to overcome these issues. However, current random linear network coding systems suffer from several problems. For example, decoding the packet combinations requires high computational complexity due to use of elimination methods similar to that of Gauss-Jordan. In addition, these systems exhibit high transmission overhead due to attaching large coefficients vectors to encoded blocks. This overhead increases each time a new packet is added to the encoded packet. As another example, one would want to easily obtain linear independence among coefficient vectors, resulting in a reduction of the efficiency.

Accordingly, a need has long existed for improved systems and methods for transmitting information over a computer network.

SUMMARY

A system for transmitting information over a network may include a server that generates random superpositions each including multiple packet fragments encoded using a Galois field and transmits them over multiple communication lines to a client device. The packet fragments may be a plurality of fixed-size vectors that define the information to be transmitted. The server also may select a subset of the fixed-size vectors based on heuristics and generate a coefficient for each of the selected vectors. The coefficients may include any natural number. The superposition may be the sum of the selected fixed-size vectors multiplied by their associated coefficients. The server may repeat the process until the client acknowledges receipt of the information or another condition is met. The client device may then decode the received superpositions, such as by solving a set of linear equations represented by the received superpositions.

Other systems, methods, features, and technical advantages of the invention will be, or will become apparent to one with skill in the art upon examination of the following figures and detailed description. It is intended that all such additional systems, methods, features, and technical advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 3 shows a flow chart for an exemplary process for encoding and transmitting information in an exemplary MAGIC system;

FIG. 4 shows a flow chart exemplary process for decoding a superposition in an exemplary MAGIC system;

FIGS. 5a-g shows a series of diagrams showing an exemplary network utilization method for a single communication link in an exemplary MAGIC system;

FIG. 7 shows another exemplary transmission distribution strategy using multiple communication links; and FIGS. 8a-d show addition, multiplication, subtraction and division tables for an exemplary GF(4) Galois field.

DETAILED DESCRIPTION OF THE PREFERRED EMBODIMENTS

Figure 1A:
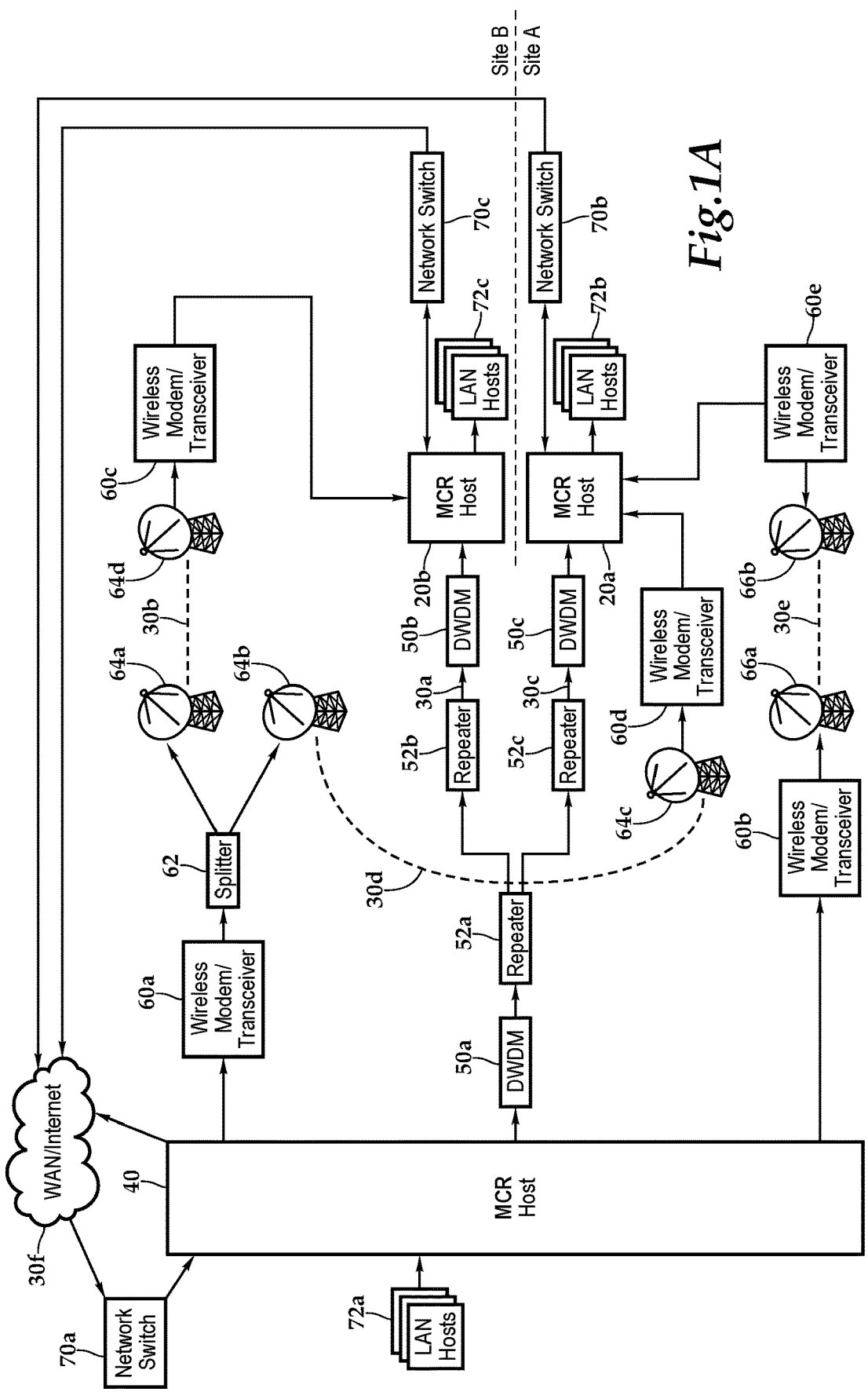
FIG. 1a shows an exemplary architecture for transmitting information using a multipath asynchronous Galois information coding ("MAGIC") system.
Figure 1B:
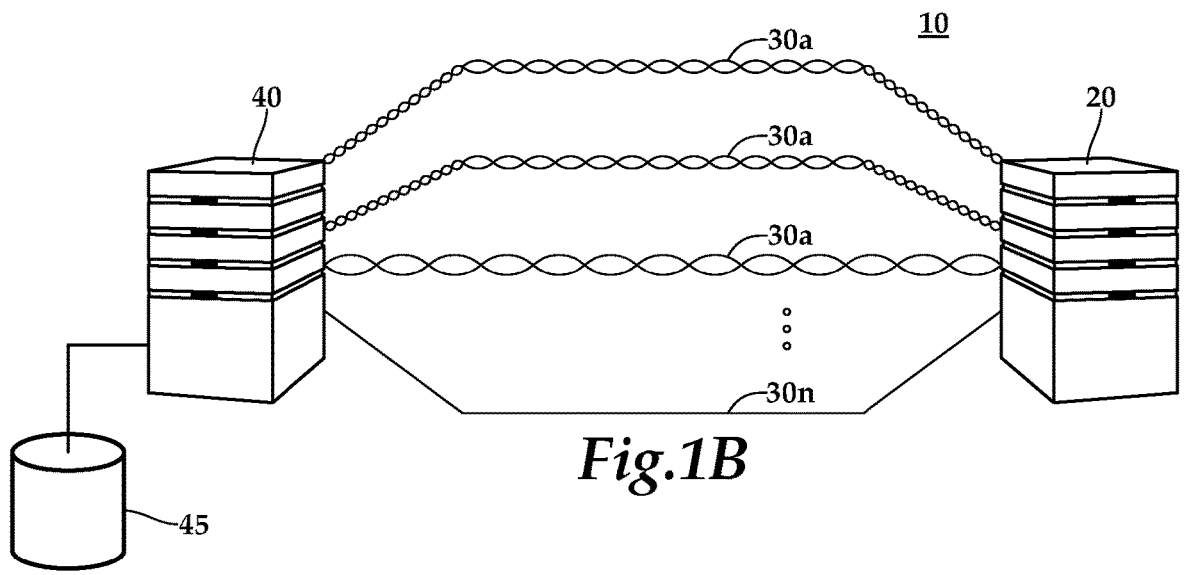
FIG. 1b shows another exemplary architecture for transmitting information using a MAGIC system.

1.0 Exemplary Multipath Asynchronous Galois Information Coding System Overview Referring to FIG. 1b, an exemplary architecture 10 for transmitting information using a multipath asynchronous Galois information coding ("MAGIC") system 10 is shown. A client device 20 may communicate with a MAGIC server 40 via a plurality of communication links 30a-n. The MAGIC server 40 may transmit information provided by a data source 45. In operation, the client device 20 may request information from the MAGIC server 40. In response, the MAGIC server 40 may encode the requested information in a Galois field, divide the encoded information into packet fragments, and transmit information including sets of packet fragments over one or more communication links 30a-n. The transmitted information may include superpositions of multiple packet fragments, as described below. The MAGIC server 40 may continue sending superpositions of multiple packet fragments until an acknowledgement is received from the client device 20 or some other end condition is reached. The client device 20 may successfully receive the information as soon as N superpositions are received for N packet fragments, regardless of which communication link was used to transmit the superposition.

As a result, several benefits are obtained. For example, the client device 20 does not need to report lost packets and wait for the server 40 to resend them. Instead, it may determine the information contained in any particular fragment so long as that fragment is included in the requisite number of superpositions. As another example, the client device 20 may determine the value of a packet fragment as soon as it receives the requisite number of superpositions, whether they be the first N superpositions sent or if the Nth superposition received was the N+1, N+10 or N+20th superposition sent by the server 40. In other words, error correction may be provided preemptively and automatically. Coordination among multiple servers 40 is also simplified, as described below. In short, the system 10 provides both low latency and high reliability data transfers that utilize the available bandwidth of the multiple communication links 30a-n efficiently.

The multipath asynchronous Galois information coding ("MAGIC") system 10 may find particular benefit when transmitting information over long distances. Because latency differences become more apparent at long distances, the benefits provided by the MAGIC server 40—low latency and high reliability while also improving bandwidth utilization—also are increased when data is transmitted over long distances. For example, the system 10 may be particularly advantageous when transmitting information from Chicago to New York (about 711 miles), New York to Los Angeles (about 2500 miles), London to Sydney (about 10,500 miles), London to Frankfurt (about 480 miles), Japan to Singapore (about 3300 miles), and the like. As another example, the systems and methods described herein may be utilized to transmit information in aerospace applications at least because the preemptive error correction features described herein may greatly increase the reliability of the communications where a request for lost packets may not be received by a traditional server for a substantial period of time (i.e., hours or days) after the original transmission.

For mobile communications—such as cellular communications—there are at least two classifications of usefulness: multicast distribution and point-to-point. Multicast distribution facilitates decoding and decrease packet pressures on the network, Point-to-point removes the need to transmit acknowledgments back to transmitters, which decreases the network load.

In some embodiments, the MAGIC server 40 may transmit feeds of data automatically (e.g. as data becomes available from the data source 45) even without receiving a specific request from a particular client 20. Other configurations also may be used.

Figure 1C:
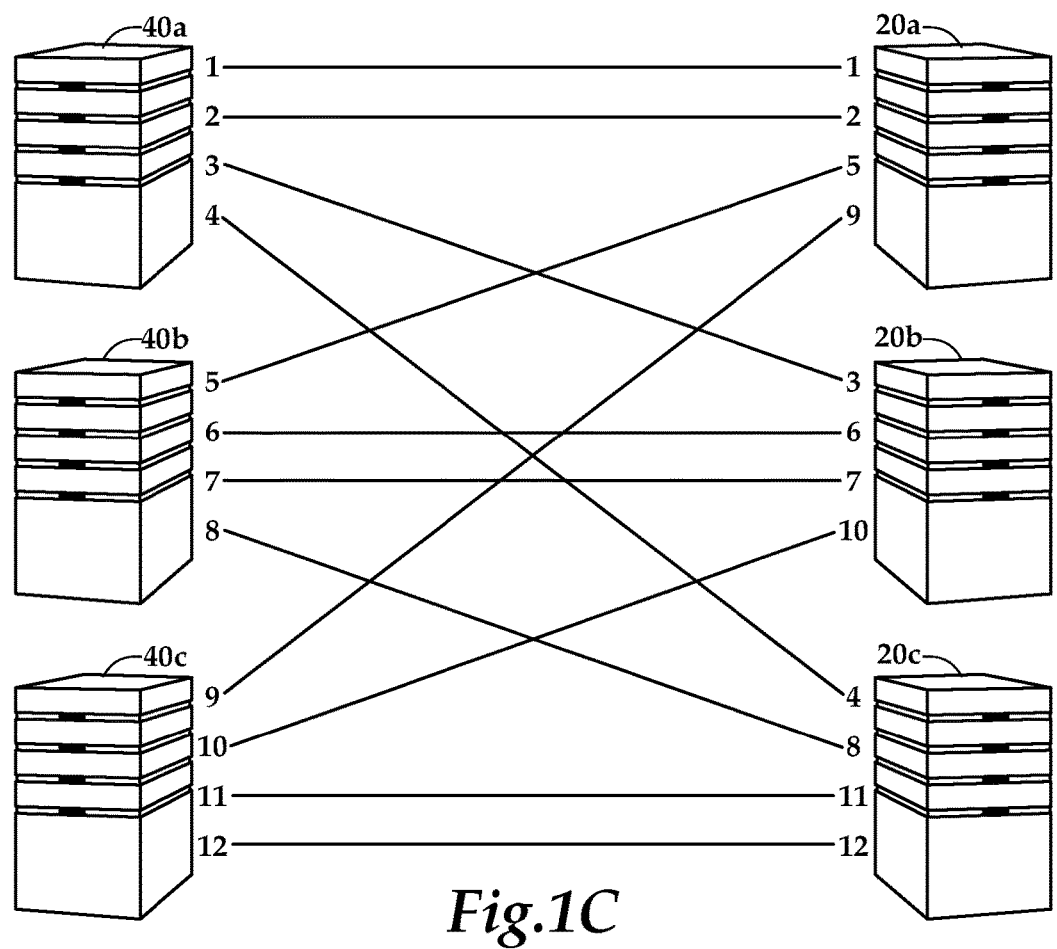
FIG. 1c shows yet another exemplary architecture for transmitting information using a MAGIC system.

Although references will now be made to specific components of the system performing specific features, it should be apparent to one of ordinary skill in the art that such references are exemplary and are not intended to limit the scope of the claims in any way; furthermore, the functionalities described herein may be implemented in a virtually unlimited number of configurations. For example, the MAGIC server 40 may be implemented as a single server configured to provide all of the system's functionalities, or the functionalities may be implemented across multiple servers. As another example, and as shown in FIG. 1c, the architecture 10b may include multiple MAGIC servers 40a-c in communication with multiple client devices 20a-c, and each MAGIC server 40a-n may communicate with each client 20a-n using one or more communication links.

1.1 Exemplary Client Device 20

The client device 20 may receive encoded packet fragments and other information from the MAGIC server 40 via the plurality of communication links 30a-n and decode the encoded packet fragments into message data. In one embodiment, client devices 20a-n may comprise stand-alone applications which may be either platform dependent or platform independent. For example, client devices 20a-n may be stand-alone applications configured to run on desktop or mobile computer such as a laptop computer, handheld computer, tablet, mobile messaging device, or the like which may all utilize different hardware and/or software packages. Alternatively, or additionally, client systems 20a-n may connect to the server 40 via the Internet using a standard browser application. As another example, one or more of the client devices 20a-n may be a mobile phone configured to run on a mobile operating system such as the iOS™ operating system from Apple Inc. located in Cupertino, Calif., the Android™ operating system from Google, Inc. located in Mountain View, Calif., or the like. As another example, client functionality may be provided by via an embedded chip(s) integrated into a client device 20. Other methods may be used to implement the client devices 20.

An exemplary client device 20 may include, for example, a Dell R640 1U-rack mounted server (provided by Dell Inc. of Round Rock, Tex.) with two multicore Intel Xeon CPUs (provided by Intel Corporation of Santa Clara, Calif.) and 16 gigabytes of DRAM. The client 20 also may include multiple multiport network interfaces and/or add-on cards for computational accelerations (i.e. custom Field Programmable Gate Arrays (FPGAs) to accelerate network packet ingress and egress, custom FPGAs and Graphical Processing Units (GPUs) to accelerate machine learning computations, and the like. Alternatively, or additionally, all of the decoding processing of a client 20 may be implemented using custom hardware, such as FPGAs, Application-Specific Integrated Circuits (ASICs), or the like. Other client devices 20 also may be used.

1.2 Exemplary Communication Links 30a-n

Figure 2A:
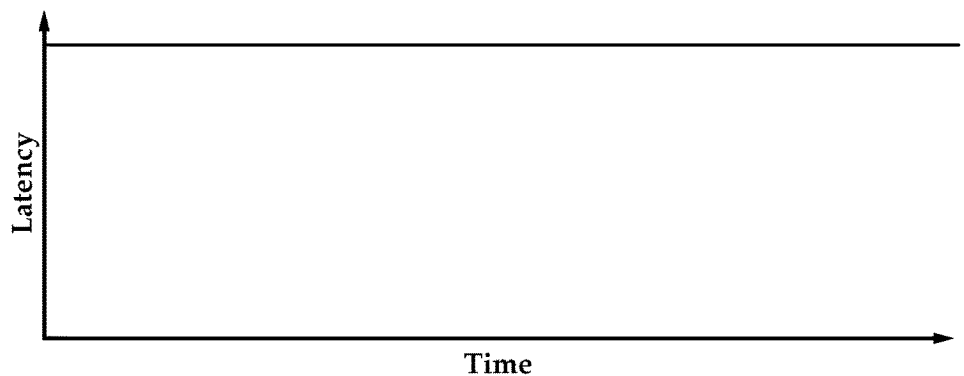
FIGS. 2a-d show various graphs depicting exemplary performance characteristics for exemplary communications links.

The communication links 30a-n may be any type any private or public communication link, such as the Internet, and may include one or more communications links. For example, the communication links 30a-n may include wired communication links, such as networks utilizing wired technologies such as fiber optical lines, Ethernet and the like. As shown in FIG. 2a, a fiber optical line provides high bandwidth and is extremely reliable, such that packet loss is rare enough to be tracked individually. However, the speed of light is 1.5 times slower in current solid core single-mode fiber than in air and lines often connect two points in suboptimal paths due to physical obstructions. As a result, solid core fiber optical lines generally have a higher latency than wireless communication paths.

Figure 2B:
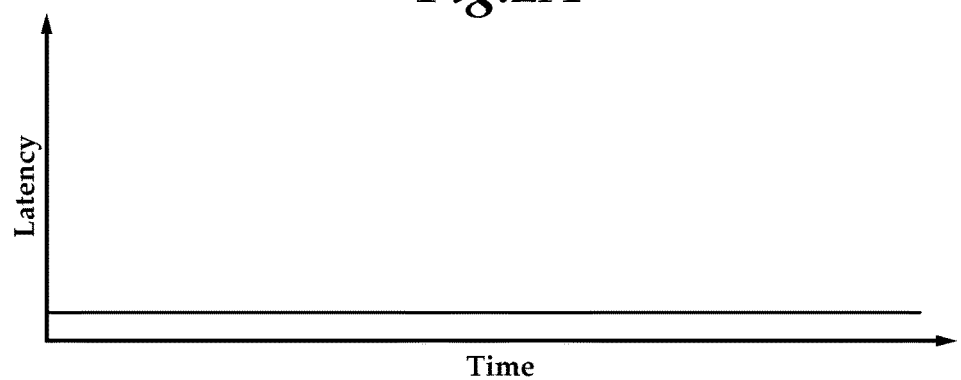
Figure 2C:
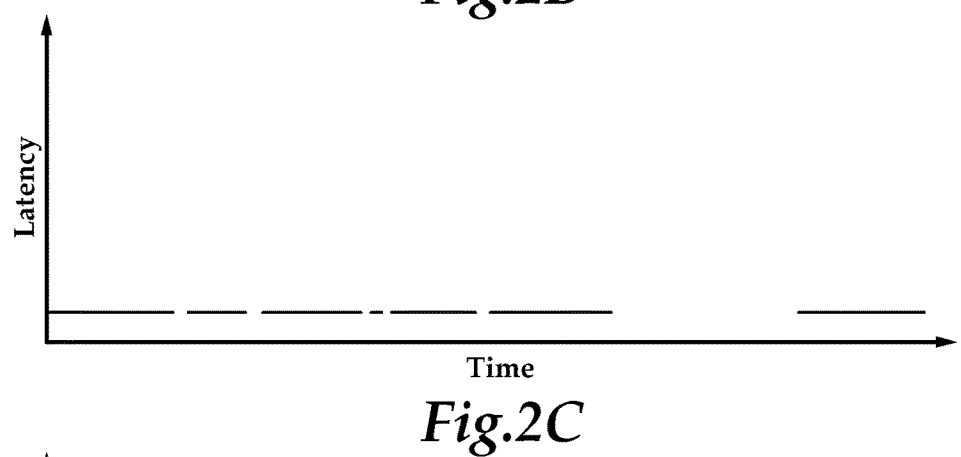

The communication links 30a-n also may include one or more wireless communication links, such as links utilizing microwave transmitters and receivers, communications devices based on one or more of the Institute of Electrical and Electronics Engineers' (IEEE) standards including 802.11 (i.e., Wi-Fi), 3G, 4G, 5G, and the like. FIG. 2b shows a typical wireless communication link or path. A wireless communication link provides communication that is near the limits of known laws of physics (i.e. the speed of light). However, compared to wired networks such as a fiber optical link, wireless communication may provide substantially less bandwidth and reliability. For example, packet loss rates for wireless communications may be about 0.1% to about 2% depending on packet size. Packet loss in a wireless network may include, for example, isolated packet loss, micro-outages that may be caused by wind, equipment vibration, loss due to network congestion, or more substantial outages caused by a storm or the like as shown in FIG. 2c. Other types of communication links 30 also may be used. Examples of such links may include satellite communications, low Earth orbit satellite communications, high altitude platform wireless communications, laser and other free space optic communication links, copper and other wired cables, high frequency (or shortwave) communications. Each of these technologies has its own unique latency, bandwidth, reliability, and other characteristics. The adaption of these and other technologies in certain ways (for example, the implementation of free space optics or microwave channels via drones) may modify the characteristics of a given communications link.

Figure 2D:
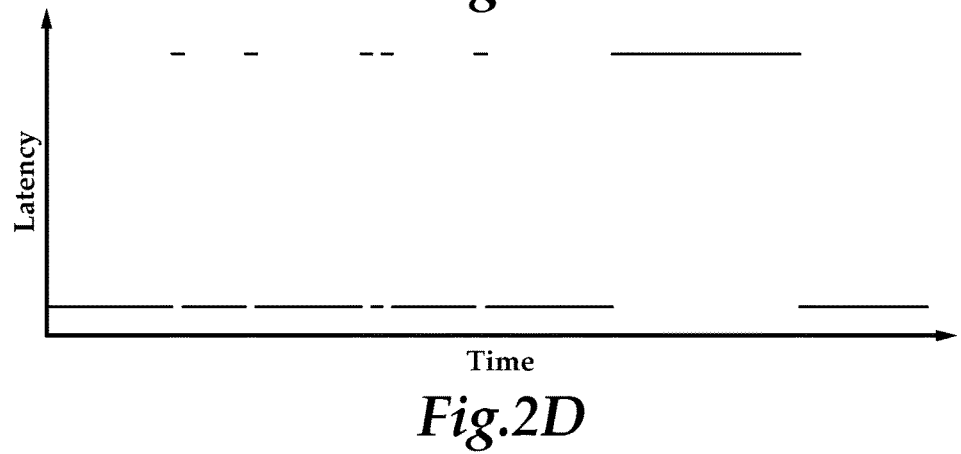

Preferably, communication links 30a-n include a combination of diverse communication channels, and more preferably one or more low latency (but low bandwidth) communication links and one or more high bandwidth (but high latency) communication links, as shown in FIG. 2d. By combining multiple communication links 30a-n and technologies and transmitting information using the MAGIC system described herein, the system 10 may overcome the inherent limitations of any single technology to transmit information quickly and reliably. In the illustrated embodiment, the low latency links may be microwave communication channels and the high bandwidth communication channels may be solid core single-mode fiber optic channels.

1.3 Exemplary MAGIC Server 40

The MAGIC server 40 may receive information from a data source 45 and transmit the information to a client device over the communication links 30a-n. In operation, the MAGIC server 40 may receive a request for data from a client device 20 (or receive new information from a data source 45) and may, in response, encode the requested information in a Galois field, divide the encoded data into fragments, generate one or more random or pseudo-random superpositions including the packet fragments, and transmit the one or more random or pseudo-random superpositions to the client device 20. In some embodiments, the MAGIC server 40 may generate the superpositions by multiplying each fragment by a random or pseudo-random coefficient and adding the multiplied fragments. Other related services also may be provided as described herein.

In an exemplary embodiment, the MAGIC server 40 may comprise a Dell R740 2U-rack mounted server (provided by Dell Inc. of Round Rock, Tex.) with two multicore Intel Xeon CPUs (provided by Intel Corporation of Santa Clara, Calif.) and 16 gigabytes of DRAM. The server 40 also may include multiple multiport network interfaces, such as 1 to 7 dual port Mellanox ConnectX network interfaces (provided by Mellanox Technologies of Sunnyvale, Calif.). The server 40 also may include custom network interfaces, such as an 8-port Exablaze Xilinix Field Programmable Gate Array (FPGA) accelerated devices and the like. In some embodiments, the MAGIC server 40 may be dedicated to the encoding/decoding processes or other processes also may be running on the server 40. For example, the MAGIC server 40 may run processes to provide preprocessed market data to the actual MAGIC encoding process or the like.

The server 40 also may include one or more add-on cards for computational accelerations (i.e. custom Field Programmable Gate Arrays (FPGAs)) to accelerate network packet ingress and egress, custom FPGAs and Graphical Processing Units (GPUs) to accelerate machine learning computations, and the like. Alternatively, or additionally, all of the encoding processing of a server 40 may be implemented using custom hardware, such as FPGAs, Application-Specific Integrated Circuits (ASICs), or the like.

1.4 Exemplary Data Sources 45

The data source 45 may store and/or provide information to the MAGIC server 40. For example, exemplary data sources may provide market data (such as public data feeds from NYSE, NASDAQ, CME, and the like), transactional data, news reports, website information, and the like. In some embodiments, the data may be pre-processed before being fed to the MAGIC server 40.

1.5 Exemplary Detailed Architecture for a Multipath Asynchronous Galois Information Coding System Overview Referring to FIG. 1a, a detailed exemplary architecture for a MAGIC system is shown. The system may include one or more MAGIC Carpet Ride (MCR) hosts that may be configured to act as either a server 40 or a client 20. In the illustrated embodiment, one MCR host is configured to act a encoder/server 40 and two MCR hosts are configure to act as decoders/clients 20a-b. The server 40 may include a plurality of network interface cards configured to interface with a plurality of technologies. On the inbound side, the server 40 may be coupled to a network switch 70a, one or more local area network (LAN) hosts 72a, and a wide area network (WAN) such as the Internet 30f (which also may be coupled to the switch 70a) to receive data from a data source 45. On the outbound side, the server 40 may be coupled to communication links including microwave technologies, millimeter wave technologies and fiber optic technologies to transmit encoded data to clients 20a and 20b.

In the illustrated embodiment, client 20a may be configured to receive encoded information across all three technologies, while client 20b may be configured to receive encoded information only via microwave and fiber optic technologies. For the reasons explained below in sections 2 and 3, transmission to each client 20a and 20b may be optimized automatically by the encoding and transmission processes described herein.

The server 40 may transmit encoded data over microwave communication links to both clients 20a-b. To do so, the server 40 may be coupled to a wireless modem/transceiver 60a (which may comprise one or more devices) coupled to a splitter 62 that feeds the encoded data to microwave dishes 64a and 64b. The microwave dishes 64a and 64b may transmit data over communication links 30b and 30d, respectively, to corresponding client-side microwave dishes 64d (for client 20b) and 64c (for client 20a). On the client side, microwave dishes 64d and 64c may be coupled to associated wireless modem/transceivers 60c and 60d, respectively, which may pass the encoded data to their respective clients 20b and 20a.

The server 40 also may transmit encoded data over fiber optic communication links to both clients 20a-b. To do so, the server 40 may be coupled to a dense wavelength division multiplexer (DWDM) 50a coupled to one or more repeaters 52a-c, one or more of which may split the signal into two feeds, in order to form communication links 30a and 30c. On the client side, DWDM units 50b and 50c may be coupled to and pass the encoded data to their respective clients 20b and 20a.

In the illustrated embodiment, the server 40 also may include millimeter wave communication links to clients 20a. To do so, the server 40 may be coupled to a wireless modem/transceiver 60b (which may comprise one or more devices) that feeds the encoded data to millimeter wave dish 66a. The millimeter wave dish 66a may transmit data over communication link 30e corresponding client-side millimeter wave dish 66b. On the client side, millimeter wave dish 66b may be coupled to a wireless modem/transceiver 60e, which may pass the encoded data to client 20a.

2.0 Exemplary MAGIC Methods for Encoding and Decoding Information

Referring to FIG. 3, flow chart for an exemplary process for encoding and transmitting information in an exemplary MAGIC system is shown. In response to the MAGIC server 40 receiving either information from a data source 45 or a request for information from a client device 20, the MAGIC server 40 may map the message onto a stream of elements from a Galois field at step 302.

A Galois field is a finite field in which the number of elements is a prime number raised to an integer power. Galois fields that utilize the prime number 2 as a base map well to typical computers (i.e. binary computers). An exemplary Galois field for use in the exemplary MAGIC system and methods described herein may be GF(4) (i.e. $2^2$). Galois fields using other powers of 2, such GF(8), GF(16) and the like also may be used. Alternatively, or additionally, Galois fields using other prime number bases or other exponents also may be used also may be used.

At step 304, the stream of Galois field numbers may be converted to a stream of vectors (also referred to as "fragments" or "packet fragments"). The vectors may be any size based on the computational resources and/or application needs. In some embodiments, the vectors may be fixed size vectors. For example, on a binary computer that is configured to operate on 32 bit words, a 16-dimension $GF(2^2)$ vector may be used. Such a vector would superpose 4 bytes of data. Other fragment or vector sizes and Galois fields also may be used.

Once converted, the fragments may be appended to the stream of fragments to be transmitted by the MAGIC server 40 (the "output stream"). In some embodiments, the MAGIC server may assign the fragments a sequence number indicating where a particular fragment goes in the overall sequence of transmitted fragments when appending the fragment to the output stream.

At step 306, the MAGIC server 40 may select fragments to transmit in accordance with transmission heuristics. In some embodiments, a superposition may include every fragment for which the MAGIC server 40 has not been acknowledged as successfully received by the client device 20. Alternatively, or additionally, various other heuristics may be used, as described below in Section 2.2.

At step 310, the MAGIC server 40 may generate coefficients for each of the packet fragments to be added in a superposition. In some embodiments, the MAGIC server may generate coefficients randomly (or pseudo-randomly) for each fragment to be included in the superposition. Random (or pseudo-randomly) coefficient generation may increase the likelihood that each superposition is linearly independent from all other superpositions to be transmitted by the MAGIC server 40. In some embodiments, the coefficients may be any natural number (i.e. any positive integer or zero). Coefficient generation is described in more detail below in Section 2.3.

At step 312, the MAGIC server 40 may generate a superposition by adding the selected fragments as multiplied by the coefficients. In other words, the superposition, fragments and coefficients define a linear equation. For example, assuming fragments α and β, an exemplary superposition may be the value of "$2\alpha+4\beta$". Exemplary superpositions including three fixed-size vectors or fragments is shown below in the detailed encoding and decoding example provided in section 3.0. The server 40 also may include header information from which a client device may determine the fragment sequence numbers and the coefficients used in the superposition, as described below in sections 2.3. Finally, at step 314, the MAGIC server 40 may transmit the superposition to a client device over one or more of the communication links 30. For example, the MAGIC server 40 may transmit the superposition over a single wireless link, a single wired link, or any combination of available wireless and/or wired links.

In some embodiments, the MAGIC server 40 may continue generating and transmitting superpositions until an end condition is reached at step 314. For example, as described below with reference to FIG. 7, the MAGIC server 40 may generate a plurality of superpositions and transmit different superpositions across each and every available communication link 30 until an end condition has been satisfied. Exemplary end conditions include an end condition that has been satisfied implicitly based on the estimated latency to the receiver and the amount of time elapsed between the appending of fragments the input data stream, explicitly by receiving an acknowledgement from the client device, and the like.

Referring to FIG. 4, a flow chart for an exemplary process 400 for decoding a superposition in an exemplary MAGIC system is shown. The client device 20 may receive a superposition at step 402. In some embodiments, the client device 20 may categorize received packet fragments into four categories: distant past, past, present and future. Fragments in the "distant past" category may include fragments that not known, not knowable, and/or forgotten but too old to matter by the client device. This may include, for example, information lost after a system reboot or information that may be discarded to free-up system resources. Fragments in the "past" category may include fragments that have been solved by or are otherwise known to the client device 20. The "present" category may include fragments of which the client device is aware but the specific value of the fragment is not yet known (i.e. fragments that are currently being solved by the client device 20). Finally, fragments in the "future" category may include fragments of which the client device is unaware, such as fragments that have yet to be sent to a client. Upon receipt of a superposition including any new fragments (i.e. "future" fragments), the client device may add these fragments to the "present" category at step 404.

At step 406, the client device 20 may determine the coefficients for each fragment contained in the superposition. Coefficients may be determined, for example, by extracting the coefficients from header information sent along with the superposition. Alternatively, or additionally, the client device 20 may recreate coefficients based on a set of control information included in the header, such as using the control information in a hash function to determine the coefficient for each packet fragment in the superposition. Coefficient recreation is described in more detail below in section 2.3.

Once the client device has determined the coefficients for each fragment in a superposition, the client device may solve for each fragment value. In some embodiments, the client device may use principles of Gauss-Jordan elimination to solve the current system of equations that have yet to be solved. For example, in one embodiment, the client device 20 may substitute any "past" fragments (i.e. fragments that are currently known to the client device 20) at step 408 and then forward substitute other equations from the current system of equations to be solved at step 410. Next, the client device may normalize the current equation so that the leading coefficient is 1 at step 412 and then backward substitute the normalized equation into other equations in the current system at step 414. Any solved fragments may be added to the "past" and any solved equations may be removed from the system at step 416. If all equations are solved (step 418), the decoding process may end. Otherwise, if any remaining fragments and equations still need to be solved, the client device 20 may add the current equation to the system of outstanding equations at step 420 and await the arrival of another superposition at step 402 and then repeating the process. Other methods also may be used to solve superpositions. An exemplary decoding process using exemplary superpositions is shown in more detail below in Section 3.0.

2.1 Exemplary Communication Link 30 Utilization Methods

Referring to FIGS. 5*a-g*, a series of diagrams showing an exemplary network utilization method for a single communication link in an exemplary MAGIC system is shown. As shown in FIG. 5*a*, an input fragment stream may consist of two packet fragments denoted as $\alpha$ and $\beta$. In some embodiments, server 40 may transmit the packet fragments as soon as they are available, first transmitting fragment $\alpha$ during a first time slice (as shown in FIG. 2*b*) and transmitting fragment $\beta$ during the next available time slice (as shown in FIG. 2*c*). In FIG. 5*d*, the two fragments $\alpha$ and $\beta$ have already been sent, and a typical system may underutilize the available bandwidth of the communication link 30*a* by allowing a time slice to remain empty. Using the principles described herein, the MAGIC server 40 may generate and transmit a superposition, as shown in FIG. 5*e*. In the illustrated example, the superposition is "$\alpha+\beta$". The server 40 may continue transmitting pseudo-random superpositions in each successive time slices, such as the superpositions "$5\alpha+3\beta$" and "$\alpha+2\beta$" (as shown in FIG. 5*f*). Because the server 40 continuously transmits pseudo-random superpositions, the client device will be able to decode any N fragments as soon as any N linearly independent superpositions or direct fragments are received. In the illustrated embodiment, the client device 20 may decode $\alpha$ and $\beta$ as soon any two transmitted fragments or superpositions are received. As shown in FIG. 5*g*, even if four of the six transmissions are failures, the client device 20 may decode the values of fragments $\alpha$ and $\beta$ from the superpositions "$5\alpha+3\beta$" and "$4\alpha+\beta$".

In the example shown in FIGS. 5*a-g*, the MAGIC server 40 may transmit a mixture of direct fragment values and pseudo-random superpositions based on multiple fragment values. Alternatively, the MAGIC server 40 may transmit only superpositions in some embodiments.

Figure 6A:
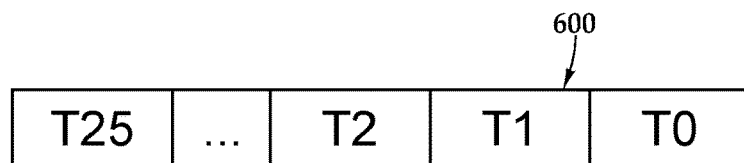
FIG. 6a shows an exemplary packet fragment stream.
Figure 6B:
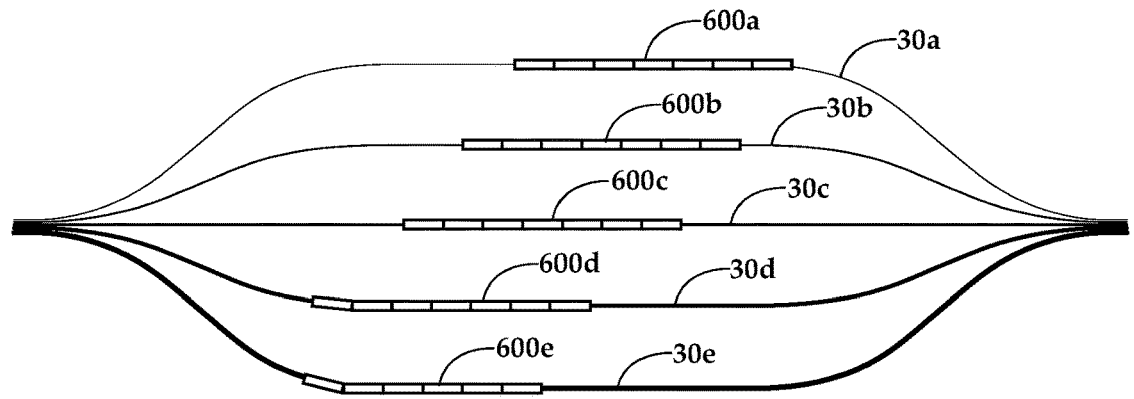
FIGS. 6b-d show exemplary transmission distribution strategies using multiple communication links.

Referring to FIGS. 6*a-d*, an exemplary packet fragment stream and exemplary transmission distribution strategies using multiple communication links 30*a-d* are shown. In FIG. 6*a*, an exemplary packet stream 600 is shown. In the illustrated embodiment, the stream includes packet fragments 0-25. In some embodiments, the MAGIC server 40 may transmit all information (illustrated as 600 *a,b,c,d,e*) over each available communication link 30*a-e*, as shown in FIG. 6*b*. By transmitting the all of the information over all of the available communication links 30*a-n*, the system 10 may provide maximum reliability, however, this approach does not maximize the total bandwidth provided by the multiple communication links 30*a-n*.

Figure 6C:
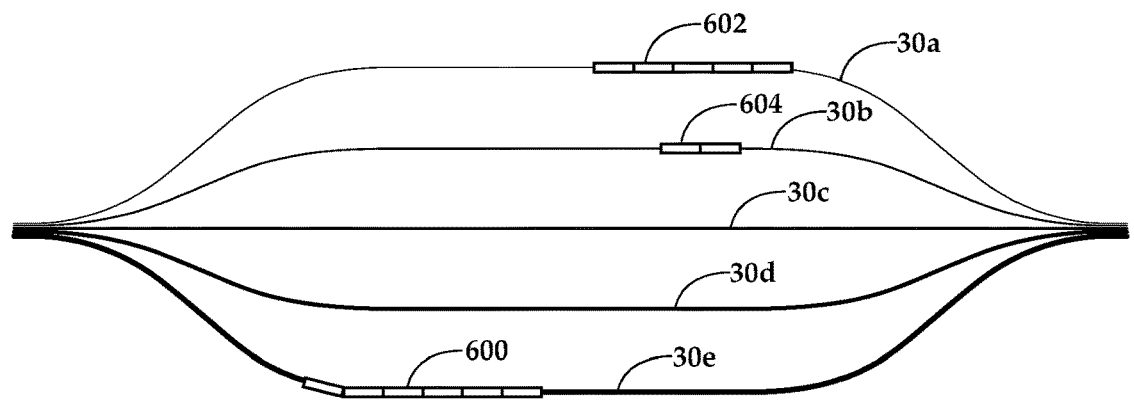
Figure 6D:
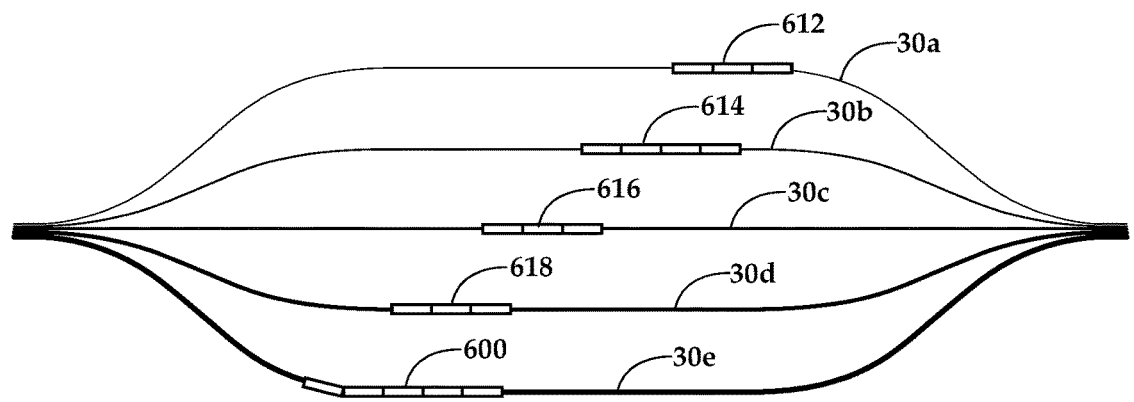

In some embodiments, the total bandwidth provided by the multiple communication links 30*a-n* may be better utilized by dividing the input stream 600 into various fragments and transmitting fragments across an available communication link 30. For example, as shown in FIG. 6*c*, various fragments 602 and 604 of the input stream 600 may be transmitted over multiple lower latency/reliability communication link 30*a* and 30*b*. In addition, the entire input stream 600 may be transmitted over a higher reliability/latency back-up communication link 30*e*. Using this approach, the total bandwidth provided by the multiple communication links 30*a-n* may be better utilized and the system as a whole may be at least as reliable as the wired, back-up communication link 30*e*. A modified version of this approach is shown in FIG. 6*d*, in which groups of fragments 612, 614, 616 and 618 having substantially similar sizes may be transmitted over low latency/reliability communication links 30*a*, 30*b*, 30*c* and 30*d*, respectively. While FIG. 6*d* illustrates the entire input stream transmitted over wired, back-up communication link 30*e*, it is contemplated also that the input stream is transmitted without a full backup. The modified approach may provide even better utilization of the total bandwidth provided by the multiple communication links 30*a-n* and also be at least as reliable as the back-up communication link 30*e*.

Referring to FIG. 7, an exemplary distribution strategy in a preferred embodiment in which the multiple communication links 30*a-n* may be combined into a single logical path and each link 30-*n* may be asynchronously filled to capacity independent of each other and regardless of if new information is available for transmission. As illustrated, the MAGIC server 40 may generate pseudo-random superpositions of multiple packet fragments (for example, by generating coefficients for each fragment in the superposition using the methods described below in section 2.3) and transmit different superpositions across each of the available communication links 30*a-e*, which may include a plurality of low latency wireless links and at least one highly reliable wired link.

By employing the principles described herein, the high reliability wired path may act like both a backup channel and a primary communication channel. In ideal operating conditions, the wired link may mostly serve to recover from micro-outages and provides extra capacity to handle overflow of sporadic data bursts (over the capacity of the faster wireless channels). In less ideal operating conditions—including partial or complete channel outages on other channel(s) it becomes the primary channel. This is enabled because the server 40 implicitly and instantaneously adapting to utilize the wired path in the most effective way given the input data and channel conditions by sending pseudo-random superpositions over the available links 30a-e.

Using this approach, no explicit coordination is required for a client device 20 to receive the message over the multiple communication links 30a-n. Instead, all the client device 20 needs is enough superpositions to determine the transmitted information (i.e. N linearly independent superpositions to determine N fragments). The client device 20 may receive the superpositions over one or more communication link 30a-n or even from multiple servers 40.

Randomly or pseudo-randomly chosen coefficients are very highly likely to achieve linear independence without any additional coordination provided the rate input data is scheduled is below the information theoretical bandwidth capacity of the communication links 30a-e, particularly when the number of fragments in a superposition is increased and/or high order Galois fields are used. In addition, because the generation of superpositions by the MAGIC server 40 and the decoding of a superposition by a client device 20 may be computed efficiently using bit operations as a result of encoding the fragments in a Galois field, the additional time required to perform these operations is negligible compared to the overall latency of a communication link.

In operation, a variety of benefits may be realized using MAGIC systems and methods. For example, when streaming information to one or more receivers/client devices 20, such as the environment shown in FIG. 1b, all links fed by a transmitter may be running asynchronously at about a 100% utilization rate, continuously making pseudo-random superpositions of data recently scheduled for transmission. Client devices 20 may receive these superpositions from whatever communication links 30a-n are available to them to get information as fast and as reliably as possible. In some embodiments, this may include automatic bandwidth sharing of multiple dissimilar links and instantaneous adaption to network drops and outages. Even more surprisingly, this approach may still be optimal even when there are multiple client devices 20 that are serviced by the different sets of communication links 30a-n, as shown in FIGS. 1a-b. One factor that may contribute to this benefit is the use of communication link identifiers to generate pseudo-random coefficients, as described below in Section 2.3. Because the link identifiers are different from one another, their use in generating coefficients is likely to cause server 40 to generate different coefficients on each link 30a-e. Thus, regardless of which links 30a-e are available to a given client 20, the client is likely to receive linearly independent superpositions.

Alternatively, or additionally, other utilization rates may be used. For example, the MAGIC server 40 may transmit information at a utilization rate of at least about 65%, preferably at a utilization rate of at least about 80%; even more preferably at a utilization rate of at least about 90% and in some embodiments at a utilization rate of at least about 95%. As noted above, the embodiment shown in FIG. 7 transmits information at a utilization rate of about 100%. Lower utilization rates also may be used.

As another exemplary benefit provided by this approach, a single server 40 may be able to service different requests from different client devices 20 using a single superposition. For example, suppose a first client device 20 may need fragment A and a second client device may need fragment B. A MAGIC server 40 may generate a single superposition containing fragments A and B and transmit the superposition to each client device.

As yet a further exemplary benefit, a client device 20 may receive a single set of information from multiple servers 40 without any need to coordinate among the server. For example, suppose a client device 20 requests a set of information consisting of ten fragments. Further suppose that ten servers 40 each receive the request, generate a superposition including the ten fragments, and transmit the superposition to the client device 20. At this point, the client device 20 has all of the information required to determine each of the ten fragments it needs (assuming each superposition is linearly independent) in about $\frac{1}{10}$ of the time it would take to receive the information using traditional methods. Other benefits may be apparent to one of ordinary skill in the art.

2.2 Exemplary Fragment Selection Heuristics

As noted above, the MAGIC server 40 may select one or more packet fragments to include in a superposition in accordance with various heuristics. In some embodiments, heuristics may be used to reduce the amount of work necessary on both the transmitting device (MAGIC server 40) and receiving device (client device 20). For example, the heuristics may enable the MAGIC server 40 to superimpose data that the MAGIC server 40 has designated most likely be helpful for the receiver (client device 20) to make progress at decoding the fragment stream. Heuristics balance the amount of useful information that may be extracted from a given superposition with the computational cost associated with decoding the elements of the superposition. Thus, to the extent the endpoints of the transmission (i.e. the MAGIC server 40 and the client device 20) provide computational resources and the more efficiently superpositions can be encoded and decoded, overinclusion of fragments (i.e. including fragments already known by the recipient in a given superposition) may be preferable to under inclusion (i.e. failing to include a fragments not known by the recipient in a given superposition).

Exemplary heuristics include acknowledgement based heuristics, time based heuristics, size or number based heuristics or the like. Other heuristics also may be used. An exemplary acknowledgement based heuristics may include selecting all packet fragments for which an acknowledgement of receipt has not been received by all recipients. Exemplary acknowledgement based heuristics may include selecting all packet fragments which have been received from the data source 45 in a given period of time, such as 10 milliseconds, 100 milliseconds, 1 second, 5 seconds, 10 seconds or the like. Other times also may be used. In some embodiments, the time period may be selected based on the speed of the slowest or most reliable communication link 30. Exemplary size or number based heuristics may include selecting the last 2, 5, 10 or 20 packet fragments or the packet fragments comprising the last 1 MB, 5 MB, 10 MB worth of information. Different heuristics also may be combined, such as selecting no more than 10 fragments unless they were received from a data source longer than 10 seconds from the time of transmission.

2.3 Exemplary Coefficient Generation

In some embodiments, the coefficients for the packet fragments to be included in a given superposition may be any natural number (i.e. any positive integer or zero). Coefficients may be generated in a variety of ways. For example, a random number generator may be used to generate coefficients. In some embodiments, a timestamp, such as a timestamp designating the time of transmission, may be used with a random number generator to generate coefficients for each fragment. Alternatively, or additionally, a communication link 30 identifier also may be used to generate coefficients, as may certain synchronized information that may be known by the server 40 and client device 20. Other information also may be used to generate coefficients.

In some embodiments, coefficients may be determined using a hash algorithm based on a set of control information that may be included in header data transmitted to the client device along with the superposition. In some embodiments a full avalanche integer to integer hash algorithm may be used.

The control information may include, for example, a timestamp and a communication link identifier, which may be combined with synchronized information known by the server 40 and client 20. In this way, the client device may be able to regenerate the coefficients for the received superposition, eliminating the need to include each coefficient in the header information. This approach may provide several benefits. For example, the system may be more secure because the specific hash function and/or synchronized data may be proprietary, reducing the ability of a potential hacker to make sense of intercepted transmissions. In addition, because the control information is a fixed size, its transmission is easier to manage as opposed to a literal listing of the coefficients used in the superposition, which may vary based on the number of fragments in a given superposition. As another benefit, where a timestamp is included in the coefficient control information, latency may be calculated on the receiving end (client device 20) in high precision for each individual superposition at no additional cost.

3.0 Exemplary MAGIC Transmission of a Message

The following is an exemplary message transmission using some of the MAGIC systems and methods described herein. In this example, the message to be sent is "HI, CHICAGO!"

Initially, this message may be mapped onto a stream of elements from the Galois field GF(4). GF(4) has four elements that may be denoted suggestively as 0, 1, 2, 3. In this example, 0 may be the additive identity element of the field and 1 may be the multiplicative identity element of the field and the Galois field mapping may be based on a typical ASCII character encoding written in base 4 to correspond to the elements in GF(4). As a result, the following exemplary Galois field mapping of the symbols in the message to elements in GF(4) may be used:

TABLE 1.0

Exemplary Galois Field Mapping

... snip ...

|   |   |   |   |
|---|---|---|---|
| - 0200 | ! - 0201 | " - 0202 | # - 0203 |
| $ - 0210 | % - 0211 | & - 0212 | ' - 0213 |
| ( - 0220 | ) - 0221 | * - 0222 | + - 0223 |

TABLE 1.0-continued

Exemplary Galois Field Mapping

|   |   |   |   |
|---|---|---|---|
| , - 0230 | - - 0231 | . - 0232 | / - 0233 |
| 0 - 0300 | 1 - 0301 | 2 - 0302 | 3 - 0303 |
| 4 - 0310 | 5 - 0311 | 6 - 0312 | 7 - 0313 |
| 8 - 0320 | 9 - 0321 | : - 0322 | ; - 0323 |
| < - 0330 | = - 0331 | > - 0332 | ? - 0333 |
| @ - 1000 | A - 1001 | B - 1002 | C - 1003 |
| D - 1010 | E - 1011 | F - 1012 | G - 1013 |
| H - 1020 | I - 1021 | J - 1022 | K - 1023 |
| L - 1030 | M - 1031 | N - 1032 | O - 1033 |

... snip ...

Using the above mappings, the message expressed as a stream of elements in GF(4) is:

TABLE 2.0

Message Expressed As GF(4) Elements

| 1020 | 1021 | 0230 | 0200 | 1003 | 1020 | 1021 | 1003 | 1001 | 1013 | 1033 | 0201 |
|------|------|------|------|------|------|------|------|------|------|------|------|
| H | I | , |   | C | H | I | C | A | G | O | ! |

Next, the stream of numbers in GF(4) may be converted to a stream of fixed dimension vectors in GF(4) (also referred to as "fragments"). For example, using a vector dimension of 16, the message may become the following three vectors:

TABLE 3.0

Message Represented As Fixed-Size Vectors

| | |
|---|---|
| (1,0,2,0; 1,0,2,1; 0,2,3,0; 0,2,0,0) | H I , "" |
| (1,0,0,3; 1,0,2,0; 1,0,2,1; 1,0,0,3) | C H I C |
| (1,0,0,1; 1,0,1,3; 1,0,3,3; 0,2,0,1) | A G O ! |

Next, the fragments may be appended to the stream of fragments to be transmitted by the MAGIC server 40 and the fragment's sequence number may be assigned. In this example, assume 7 fragments (x0 through x6) have previously been appended to the stream. The three new vectors for the message "HI, CHICAGO" may be assigned the sequence numbers x7, x8, and x9, respectively:

TABLE 4.0

Fixed-Size Vectors Assigned Packet Sequence Numbers

| | | |
|---|---|---|
| x7 | (1,0,2,0; 1,0,2,1; 0,2,3,0; 0,2,0,0) | H I , "" |
| x8 | (1,0,0,3; 1,0,2,0; 1,0,2,1; 1,0,0,3) | C H I C |
| x9 | (1,0,0,1; 1,0,1,3; 1,0,3,3; 0,2,0,1) | A G O ! |

Suppose there is free bandwidth on a communication link having a link identifier of l=2 to transmit information at a time t=59345212. The MAGIC server 40 may select particular fragments and add them in a superposition.

Suppose the MAGIC server 40 has determined that the client device 20 has already determined fragments x0 through x6. If so, the MAGIC server 40 would conclude it needs to superpose fragments x7, x8 and x9. First, the MAGIC server 40 would determine coefficients (ct7, ct8 and ct9) to be used to scale these fragments. For example, the MAGIC server 40 may initialize a pseudo-random number generator with the output of a hash function that includes the current time (t), the link that has the free bandwidth (l) and other shared synchronized data already known to both the MAGIC server 40 and client device 20. For this example, assume that the MAGIC server 40 determines that, based on given control information, ctl7 is 3, ctl8 is 1, and ctl9 is 0.

Once the coefficients have been determined, the fragments may be superposed to form a MAGIC encoded fragment ytl:

$$ytl = ctl7*x7 + ctl8*x8 + ctl9*x9 \qquad (eq.\ 1)$$

The MAGIC server 40 is able to compute the superposition efficiently because, for example, addition and multiplication tables are given for Galois fields that never overflow. The addition and multiplication tables for GF(4) are shown in FIGS. 8a and 8b, respectively. The tables for subtraction and division follow from the addition and multiplication tables, and are shown in FIGS. 8c and 8d, respectively. For GF(4), subtraction has an identical table as addition.

Using these tables, the MAGIC server 40 computes the following:

$$ctl7*x7 = 3*(1,0,2,0;1,0,2,1;0,2,3,0;0,2,0,0) = (3,0,1,0;3, 0,1,3;0,1,2,0;0,1,0,0) \qquad (eq.\ 2)$$

$$ctl8*x8 = 1*(1,0,0,3;1,0,2,0;1,0,2,1;1,0,0,3) = (1,0,0,3;1, 0,2,0;1,0,2,1;1,0,0,3) \qquad (eq.\ 3)$$

$$ctl9*x9 = 0*(1,0,0,1;1,0,1,3;1,0,3,3;0,2,0,1) = (0,0,0,0;0, 0,0,0;0,0,0,0;0,0,0,0) \qquad (eq.\ 4)$$

Adding these multiplied fragments yields the following superposition:

$$ytl = (2,0,1,3;2,0,3,3;1,1,0,1;1,1,0,3) \qquad (eq.\ 5)$$

The MAGIC server 40 then sends the logical message to the client device (ignoring various standard network headers): at t=59345212 on link l=2, ctl7*x7+ctl8*x8+ ctl9*x9=ytl=(2,0,1,3; 2,0,3,3; 1,1,0,1; 1,1,0,3).

This message informs any particular client device 20 that fragments x7, x8 and x9 were mixed together according to the pseudo-random coefficients that would be generated at that particular time for that particular link to yield the resulting superposition.

As noted above, the client device 40 can recreate the coefficients with the information in this packet because it has enough information to initialize a pseudo-random-generator to generate the coefficients using the same control information used by the MAGIC server 40. As such, the coefficients do not need to be explicitly sent (although they may be in some embodiments). In addition, because time is always changing (and, in the case of multiple transmitters operating in parallel, because the link used for the transmission is included in the hash function), the coefficients used for an superposition may be identically and independently distributed given a high quality shared hash function.

On receipt, assume the client device knows fragments before x0 are in the "distant past," fragments x0 through x6 are in the "past," and there are no fragments in the "present" such that all fragments beyond x6 are in the "future." Then, on receipt of the above, fragments x7, x8 and x9 may be moved from the "future" to the "present." The client device 20 then begins the decoding process to determine the value of the individual fragments and move these fragments from the "present" to the "past." To that end, the client device 20 may regenerate the coefficients used, yielding:

$$3*x7 + 1*x8 + 0*x9 = (2,0,1,3;2,0,3,3;1,1,0,1;1,1,0,3) \qquad (eq.\ 6)$$

The client device 20 may then subtract off any terms involving fragments in the "past" and append the result to the system of equations in the client device's present. Since there are no fragments in this equation in the "past," nothing would be done for this particular fragment. Next, the client device 20 may forward substitute other equations involving fragments in the present. Since there are no other equations yet, nothing would be done for this particular fragment. These two steps are analogous to an incremental Gauss-Jordan forward-elimination. In some embodiments, the client device 20 may normalize the equation to make the leading coefficient 1 to facilitate future forward and backward substitution. Here the leading coefficient is 3, so the client device 20 may divide the equation by 3 to yield:

$$1*x7 + 2*x8 + 0*x9 = (3,0,2,1;3,0,1,1;2,2,0,2;2,2,0,1) \qquad (eq.\ 7)$$

The client device 20 may then eliminate the leading term of this equation by back-substituting this equation in other equations involving fragments in the "present." Since there are no other equations yet, nothing would be done here. Finally, any equations that have been solved may be removed from the outstanding system of equations. Otherwise, the equation may be added to the system of outstanding equations. In this example, the client device 20 may save Eq. 7 to its system of outstanding equations.

Suppose at the exact same time, link 3 has available bandwidth. The MAGIC server 40 may generate the coefficients ctl7=1, ctl8=0, ctl9=2 such that it transmits the following logical message: at t=59345212 on link l=3, ctl7*x7+ctl8*x8+ctl9*x9=ytl=(3,0,2,2; 3,0,0,0; 2,2,2,1; 0,1, 0,2). Note that even though this message is sent at the same time, because the link is different, the coefficients generated are different.

On receipt, the client device 20 may go through the same decoding process outlined above. First, it may form the original equation by recreating the coefficients, resulting in the following:

$$1*x7 + 0*x8 + 2*x9 = (3,0,2,2;3,0,0,0;2,2,2,1;0,1,0,2) \qquad (eq.\ 9)$$

Next, the client device 20 may forward substitute all fragments from the past. Because there are no "past" fragments at this time, nothing would be done. Then, the client device 20 may forward substitute any existing equations into the current equation. Here, Eq. 7 is already existing in the system, so it would be forward substituted into this equation as follows:

$$1*x7 + 2*x8 + 0*x9 = (3,0,2,1;3,0,1,1;2,2,0,2;2,2,0,1)) \qquad (eq.\ 7)$$

$$1*x7 + 0*x8 + 2*x9 = (3,0,2,2;3,0,0,0;2,2,2,1;0,1,0,2) \qquad (Eq.\ 9)$$

This forward substitution yields:

$$2*x8 + 2*x9 = (0,0,0,3;0,0,1,1;0,0,2,3;2,3,0,3) \qquad (Eq.\ 10)$$

This result may then be normalized to yield:

$$1*x8 + 1*x9 = (0,0,0,2;0,0,3,3;0,0,1,2;1,2,0,2) \qquad (Eq.\ 11)$$

Finally, the client device 20 may back-substitute this result. No equations are solved so the receiver now has two outstanding partially simplified equations:

$$1*x7 + 0*x8 + 2*x9 = (3,0,2,2;3,0,0,0;2,2,2,1;0,1,0,2) \qquad (Eq.\ 9)$$

$$1*x8 + 1*x9 = (0,0,0,2;0,0,3,3;0,0,1,2;1,2,0,2) \qquad (Eq.\ 11)$$

The client device 20 may receive a third superposition (note that it does not matter which link sent this superposition or when) as follows:

$$1*x7 + 1*x8 + 0*x9 = (0,0,2,3;0,0,0,1;1,2,1,1;1,2,0,3) \qquad (Eq.\ 12)$$

This new equation may be used for forward elimination against the first equation as follows:

$$1*x7+0*x8+2*x9=(3,0,2,2;3,0,0,0;2,2,2,1;0,1,0,2) \quad \text{(Eq. 9)}$$

$$1*x7+1*x8+0*x9=(0,0,2,3;0,0,0,1;1,2,1,1;1,2,0,3) \quad \text{(Eq. 12)}$$

This forward elimination yields:

$$1*x8+2*x9=(3,0,0,1;3,0,0,1;3,0,3,0;1,3,0,1) \quad \text{(Eq. 13)}$$

This result may be used for forward elimination against the second equation as follows:

$$1*x8+1*x9=(0,0,0,2;0,0,3,3;0,0,1,2;1,2,0,2) \quad \text{(Eq. 11)}$$

$$1*x8+2*x9=(3,0,0,1;3,0,0,1;3,0,3,0;1,3,0,1) \quad \text{(Eq. 13)}$$

This forward elimination yields:

$$3*x9=(3,0,0,3;3,0,3,2;3,0,2,2;0,1,0,3) \quad \text{(Eq. 14)}$$

Normalization of Eq. 14 yields the actual value of fragment x9:

$$1*x9=(1,0,0,1;1,0,1,3;1,0,3,3;0,2,0,1)(\text{``AGO!''}) \quad \text{(Eq. 15)}$$

Back-substitution of Eq. 15 against Eq. 9 yields the value of fragment x7:

$$1*x7=(1,0,2,0;1,0,2,1;0,2,3,0;2,0,0)(\text{``HI,''}) \quad \text{(Eq. 16)}$$

And finally, back-substitution of Eq. 16 against the Equation 11 yields the value of fragment x8:

$$1*x8=(1,0,0,3;1,0,2,0;1,0,2,1;1,0,0,3)(\text{``CHIC''}) \quad \text{(Eq. 17)}$$

Accordingly, upon receipt of the third encoded superposition, the client device 20 may solve all three fragments, x7, x8 and x9 as shown in Equations 16, 17 and 15 respectively, and the message "HI, CHICAGO!" has been successfully received. As these fragments are now solved, these fragments may be moved from the "present" to the "past" and these equations may be removed from the outstanding system of equations.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for transmitting information from a data source to a client device, comprising:
    a software module for use on a server computer comprising one or more processors and one or more memories, the software module including instructions stored on a non-transitory computer readable medium that:
        receive, from the data source, information to be transmitted to the client device;
        encode, by the server, the information in a Galois field;
        divide, by the server, the encoded information into a plurality of fragments;
        generate one or more pseudo-random superpositions, each pseudo-random superposition generated by multiplying each fragment by a coefficient and adding the multiplied fragments; and
        transmit, by the server, the one or more pseudo-random superpositions across a plurality of communication links to the client device, wherein the plurality of communication links are combined to form a single logical path.

2. The system of claim 1, wherein the plurality of communication links includes at least one wireless communication link and one wired communication link.

3. The system of claim 1, wherein the plurality of communication links comprise at least one low latency low bandwidth communication link and at least one high bandwidth high latency communication link.

4. The system of claim 3, wherein the at least one low bandwidth low latency communication link is a millimeter wave dish.

5. The system of claim 3, wherein the at least one high bandwidth high latency communication link is a fiber optical line.

6. The system of claim 1, wherein the plurality of communication links includes at least one of a satellite communication link, a low Earth orbit satellite communication link, a high altitude platform wireless communication link, a free space optic communication link, a wired communication link, and a high frequency (or shortwave) communication link.

7. The system of claim 1, wherein the server is operatively coupled to a splitter configured to feed the one or more superpositions to one or more microwave dishes.

8. The system of claim 1, wherein the server is operatively coupled to one or more repeaters configured to form one or more communication links of the plurality of communication links.

9. The system of claim 1, wherein the server is operatively coupled to a transceiver configured to feed the one or more superpositions to a millimeter wave dish.

10. The system of claim 1, wherein the software module further includes instructions that generate coefficients randomly for each fragment such that each superposition is linearly independent.

11. A method for transmitting information from a data source to a client device, comprising:
    receiving, by a server from the data source, information to be transmitted to the client device;
    encoding, by the server, the information in a Galois field;
    dividing, by the server, the encoded information into a plurality of fragments;
    generating one or more pseudo-random superpositions, each pseudo-random superposition generated by multiplying each fragment by a coefficient and adding the multiplied fragments; and
    transmitting, by the server, the one or more pseudo-random superposition across a plurality of communication links to the client device, wherein the plurality of communication links are combined to form a single logical path.

12. The method of claim 11, wherein the plurality of communication links include at least one wireless communication link and one wired communication link.

13. The method of claim 11, wherein the plurality of communication links comprise at least one low latency low bandwidth communication link and at least one high bandwidth high latency communication link.

14. The method of claim 13, wherein the at least one low bandwidth low latency communication link is a millimeter wave dish.

15. The method of claim 13, wherein the at least one high bandwidth high latency communication link is a fiber optical line.

16. The method of claim 11, wherein the plurality of communication links includes at least one of a satellite communication link, a low Earth orbit satellite communication link, a high altitude platform wireless communication link, a free space optic communication link, a wired communication link, and a high frequency (or shortwave) communication link.

17. The method of claim 11, wherein the server is operatively coupled to a splitter configured to feed the one or more superpositions to one or more microwave dishes.

18. The method of claim 11, wherein the server is operatively coupled to one or more repeaters configured to form one or more communication links of the plurality of communication links.

19. The method of claim 11, wherein the server is operatively coupled to a transceiver configured to feed the one or more superpositions to a millimeter wave dish.

20. The method of claim 11, further comprising generating coefficients randomly for each fragment such that each superposition is linearly independent.

\* \* \* \* \*